(12) United States Patent
Sawdy

(10) Patent No.: US 10,974,622 B2
(45) Date of Patent: Apr. 13, 2021

(54) BACK/HEADREST FOR A VEHICLE

(71) Applicant: NMI Safety Systems Ltd, Stevenage (GB)

(72) Inventor: Michael Sawdy, Swaffham (GB)

(73) Assignee: NMI Safety Systems Ltd

( * ) Notice: Subject to any disclaimer, the term of this patent is extended or adjusted under 35 U.S.C. 154(b) by 0 days.

(21) Appl. No.: 16/387,355

(22) Filed: Apr. 17, 2019

(65) Prior Publication Data
US 2019/0322197 A1 Oct. 24, 2019

(30) Foreign Application Priority Data
Apr. 20, 2018 (GB) ..................................... 1806440

(51) Int. Cl.
*B60N 2/30* (2006.01)
*B60N 2/874* (2018.01)
*B60N 2/24* (2006.01)
*B60N 2/433* (2006.01)

(52) U.S. Cl.
CPC ........... *B60N 2/3013* (2013.01); *B60N 2/245* (2013.01); *B60N 2/433* (2013.01); *B60N 2/874* (2018.02)

(58) Field of Classification Search
CPC ...... B60N 2/3013; B60N 2/874; B60N 2/245; B60N 2/433
USPC .................................. 297/230.14, 391, 395
See application file for complete search history.

(56) References Cited

U.S. PATENT DOCUMENTS

| 8,579,349 B1 * | 11/2013 | Schlangen | B60N 2/809 297/395 X |
| 2003/0214168 A1 * | 11/2003 | Schambre | B60N 2/856 297/391 X |

FOREIGN PATENT DOCUMENTS

| EP | 2540557 A1 | 1/2013 |
| FR | 2798331 A1 | 3/2001 |

OTHER PUBLICATIONS

Search Report under Section 17(5) dated Oct. 3, 2018, GB1806440.2, filed Apr. 20, 2018.

* cited by examiner

*Primary Examiner* — Anthony D Barfield
(74) *Attorney, Agent, or Firm* — Lane Powell, PC

(57) ABSTRACT

A device to support the back and/or head of a wheelchair user in a vehicle, the device comprising the steps of: a support arrangement; and a back/headrest which presents a substantially planar support surface, the back/headrest being moveable with respect to the support arrangement between a stowed position, in which the back/headrest is relatively close to the support arrangement, and a deployed position, in which the back/headrest is supported at a second, greater distance from the support arrangement, wherein when the back/headrest is in the stowed position the support surface lies in a first plane, and when the back/headrest moves to the deployed position, the support surface thereof is in the first plane, or in a further plane which is substantially parallel with the first plane.

15 Claims, 7 Drawing Sheets

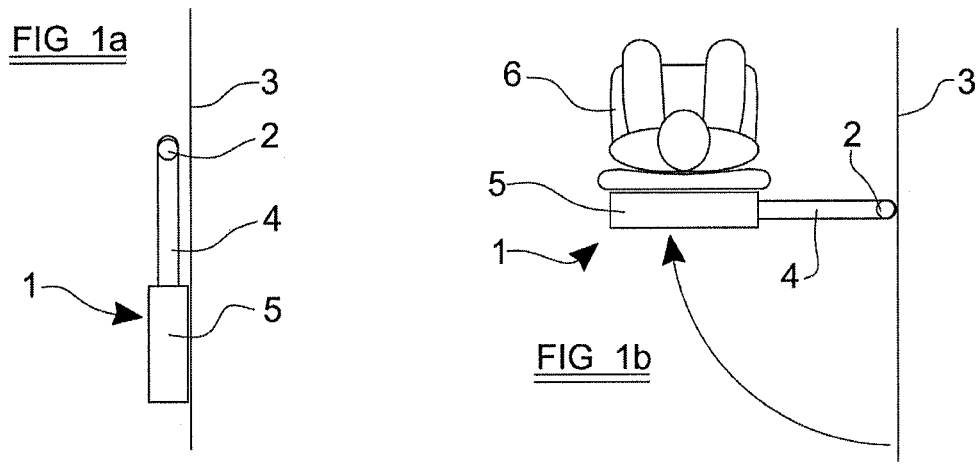
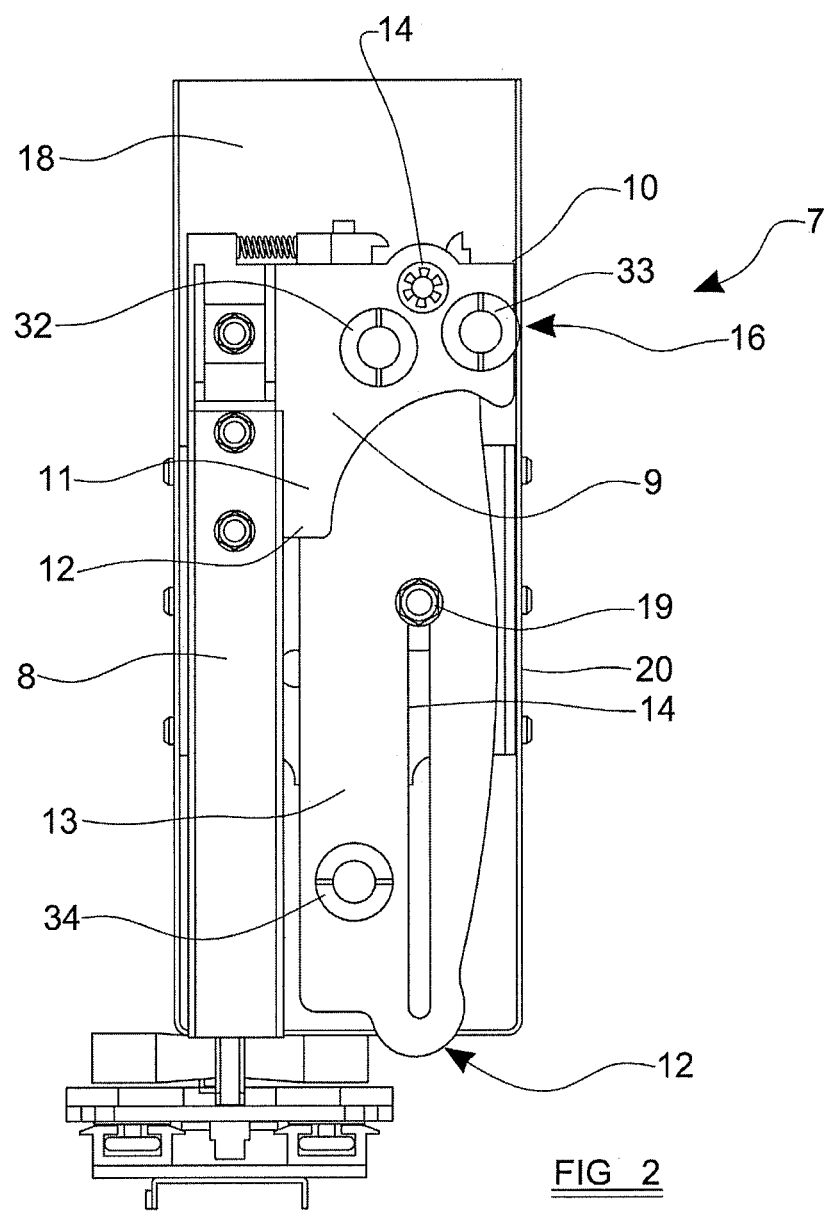

BACK/HEADREST FOR A VEHICLE

CROSS-REFERENCE TO RELATED PATENT APPLICATION

This patent application claims priority to UK Patent Application No. GB1806440.2, filed Apr. 20, 2018, and is hereby incorporated by reference.

DESCRIPTION OF INVENTION

It is known to provide, in vehicles such as ambulances, a stowable back/headrest for a wheelchair user. The back/headrest will usually be in a stowed position, in which it lies generally flat against an internal wall of the vehicle, generally an internal sidewall. To accommodate a wheelchair user in a vehicle, the back/headrest is moved into a deployed position, in which it protrudes from the wall to present a support surface lying in a plane which is generally perpendicular to the forward direction of travel of the vehicle. The back/headrest may be locked in place in the deployed position, and a wheelchair may be backed against the back/headrest, so that the back and head of the wheelchair occupant are supported by the back/headrest as the vehicle is driven.

It is an object of the present invention to provide an improved back/headrest of this type.

Accordingly, one aspect of the present invention provides a device to support the back and/or head of a wheelchair user in a vehicle, the device comprising the steps of: a support arrangement; and a back/headrest which presents a substantially planar support surface, the back/headrest being moveable with respect to the support arrangement between a stowed position, in which the back/headrest is relatively close to the support arrangement, and a deployed position, in which the back/headrest is supported at a second, greater distance from the support arrangement, wherein when the back/headrest is in the stowed position the support surface lies in a first plane, and when the back/headrest moves to the deployed position, the support surface thereof is in the first plane, or in a further plane which is substantially parallel with the first plane.

Advantageously, the support arrangement comprises a first component which is fixed in place, and the device further comprises a support arm which is pivotally attached to the fixed component, wherein the back/headrest is attached to the support arm.

Preferably, the back/headrest is pivotally attached to the support arm.

Conveniently, the back/headrest may move along at least a part of the length of the support arm.

Advantageously, the support arm has a slot formed along part of the length thereof, and wherein the back/headrest may travel along at least part of the length of the slot.

Preferably, in a first part of a deployment process, the support arm may be pivoted with respect to the fixed component, and in a second stage of the deployment process, the back/headrest may be moved along at least a part of the length of the support arm.

Conveniently, the back/headrest is connected to the fixed component such that, as the support arm pivots into the deployed position, the back/headrest is automatically driven along at least a part of the length of the support arm.

Advantageously, the device further comprises a latch arrangement which is operable to hold the support arm in the deployed position.

Preferably, the back/headrest may be locked in the deployed position with respect to the support arrangement.

Conveniently, the support arrangement is slideable along a track, and may be selectively locked in place with respect to the track at one or more attachment locations.

Advantageously, the track extends in a direction which is substantially perpendicular to the plane of the support surface.

Another aspect of the invention provides a vehicle having a device according to any of the above installed therein.

Preferably, the support arrangement is attached to, or formed as part of, an internal sidewall of the vehicle.

A further aspect of the present invention provides a method of providing support to the back and/or head of a wheelchair user in a vehicle, the method comprising the steps of: providing a device according to any one of the above, with the back/headrest being initially in the stowed position; moving the back/headrest to the deployed position; and supporting at least part of a wheelchair or wheelchair occupant against the support surface.

Conveniently, the step of providing a device comprises providing a device in which, in a first part of a deployment process, the support arm may be pivoted with respect to the fixed component, and in a second stage of the deployment process, the back/headrest may be moved along at least a part of the length of the support arm, and wherein the step of moving the back/headrest into the deployed position comprises pivoting the support arm with respect to the fixed component, and subsequently sliding the back/headrest along at least part of the length of the support arm.

Alternatively, the step of providing a device comprises providing a device in which the back/headrest is connected to the fixed component such that, as the support arm pivots into the deployed position, the back/headrest is automatically driven along at least a part of the length of the support arm, wherein the step of placing the back/headrest in the deployed position comprises substantially one single movement.

In order that the invention may be more readily understood, embodiments thereof will now be described, by way of example, with reference to the accompanying drawings, in which:

FIGS. 1a and 1b show the operation of a known back/headrest in a vehicle;

FIG. 2 shows a first back/headrest embodying the invention in a stowed position;

Figure 3:
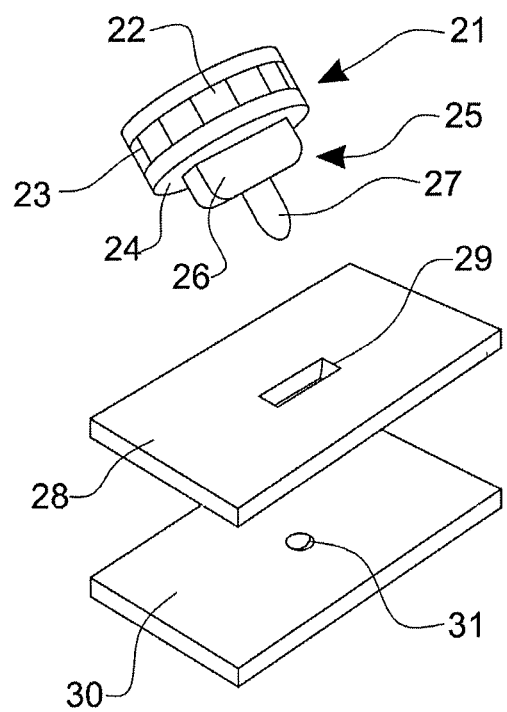
FIG. 3 shows a locking plunger suitable for use with the invention.

FIGS. 1a and 1b show schematically the operation of a conventional stowable head/backrest (referred to as a "rest" hereafter, for the purposes of brevity). The rest 1 is pivotally mounted at a support point 2, which is mounted in position on the inner side of the sidewall 3 of a vehicle. The rest 1 includes an arm 4 which extends from the support point 2, and has a padded support 5 at its distal end.

In the stowed position shown in FIG. 1a, the rest 1 lies against the inner side of the sidewall 3, so as to be relatively unobtrusive.

When the rest 1 is required, the rest 1 is pivoted around the support point 2 so that it protrudes substantially at right angles from the sidewall 3, and is locked in this position. A wheelchair 6 may then be moved into position so that the back of the wheelchair 6 rests against the front surface of the support 5, thus providing support to the wheelchair 6 while the vehicle is in motion.

Known systems of this type have been found to have certain drawbacks. Firstly, the movement of the rest 1 from the stowed position to the deployed position requires a relatively large amount of free space, for the rest 1 to move through an arcuate motion, as indicated by the curved arrow in FIG. 1b. In an ambulance or similar vehicle space is likely to be at a premium, and it may be difficult or disruptive to find sufficient space.

Secondly, if the vehicle accelerates sharply in either the forward or backwards direction (for instance, if involved in sharp braking, hard acceleration or an accident such as being "rear-ended" by another vehicle) great stress is placed on the support point 2, at which the rest 1 is pivotally connected. In extreme cases the rest 1 may pivot with respect to the support point 2, and the skilled person will appreciate that this may seriously compromise the safety of an occupant of the wheelchair 6, as well as other occupants of the vehicle.

Referring to FIG. 2, a rest 7 embodying the present invention is shown.

The rest 7 includes a support stem 8, which in this embodiment is generally vertically oriented (although this need not be the case). The support stem 8 is maintained in its vertical position, and in some embodiments may be arranged to slide laterally with respect to a track, as explained in more detail below.

A fixed plate 9 is attached to the support stem 8, at the top end thereof, extending away from the support stem 8 in a first direction. In use it is envisaged that the rest 7 will be provided against an internal wall (not shown) of a vehicle. In preferred embodiments the fixed plate 9 extends away from the support stem 8 in a direction which is substantially generally away from the internal wall of the vehicle, i.e. protruding directly outwardly into the vehicle cabin.

The fixed plate 9 is preferably held rigidly in place with respect to the support stem 8. In other embodiments the fixed plate may comprise a part of the support stem 8 itself.

In the embodiment shown the fixed plate 9 has an arcuate configuration, having a protruding portion 10 which protrudes substantially directly away from the support stem 8 in a generally horizontal direction, and a bracing portion 11 which extends downwardly along a part of the length of the support stem 8. As the skilled reader will appreciate, during use of the rest 7 forces may act on the fixed plate 9 which may tend to cause the fixed plate 9 to rotate in a direction such that the lower end 12 of the bracing portion 11 is driven against the support stem 8. The bracing portion 11 will present a generally long length of an edge of the fixed plate 9 which can bear against the support stem 8, thereby strongly resisting this rotational movement.

A support arm 13 is rotatably attached to the fixed plate 9 around a pivot point 14, which is located on the protruding part 10 of the fixed plate 9. The pivot point 14 may, for example, comprise a pivot pin passing through both the fixed plate 9 and the support arm 13.

The support arm 13 is generally elongate. In the arrangement shown in FIG. 2 the support arm 13 is in the stowed position, in which the support arm 13 extends generally downwardly from the fixed plate 9, and lies parallel or substantially parallel with the support stem 8.

The support arm 13 has an elongate slot 15 formed along part of the length thereof. In preferred embodiments the slot 15 occupies approximately half of the length of the support arm 13, although the slot 15 may be longer or shorter than this. In preferred embodiments the slot 15 is generally aligned with the length of the elongate support arm 13.

The support arm 13 is connected to the fixed plate 9, via the pivot point 14, near a first end 16 thereof. In preferred embodiments the slot 15 extends to a position at, or close to, the second, opposite end 17 of the support arm 13, i.e. the end which is furthest from the pivot point 14.

The rest 7 further comprises a support cushion 18, which will (in use) support the head and/or back of a wheelchair user. The support cushion 18 is generally rectangular, and in preferred embodiments has a padded or otherwise soft front surface, to provide comfort to the wheelchair occupant during use. In the view shown in FIG. 2, the padded front surface of the support cushion 18 is the side facing away from the viewer, i.e. opposite to the side that is visible in this figure.

The support cushion 18 is pivotally connected to the support arm 13, by a pivoting connection 19 which passes through the slot 15. In preferred embodiments this connection 19 allows the support cushion 18 to pivot freely with respect to the support arm 13. The pivoting connection 19 may also move along the length of the slot 14. In preferred embodiments the pivoting connection 19 may fit closely within the slot 14, such that the pivoting connection 19 can be moved along the slot 14 relatively easily, but will remain in any given position unless external forces act on the rest 7. In the stowed position shown in FIG. 2, the pivoting connection 19 is shown at the top side of the slot 14 (i.e. the side closest to the first end 16 of the support arm 13), and in preferred embodiments the pivoting connection 19 will remain in this position without falling downwardly under the influence of gravity.

In preferred embodiments the pivoting connection 19 comprises a bolt or rod which passes through the slot 14 in a close fit, and has a widened nut or cap on its free end to prevent the support cushion 18 from being removed from the slot 14.

In embodiments of the invention the support cushion can move along at least a part of the length of the support arm, although this could be achieved by means other than a slot formed in the support arm. For instance, a blind groove could be formed along part of the support arm, with the support arm being slidably mounted in the groove. The skilled reader will be aware of yet further ways in which this may be arranged.

In the embodiment shown a support cushion 18 has a fixing plate 20 on its rear surface, to which the pivoting connection 19 is attached.

The rest 7 shown in FIG. 2 includes three locking plungers, each of which can be used to secure two plates together in a releasable manner.

A locking plunger 21 is shown schematically in FIG. 3, and includes a grip portion 22, which takes the form of a cylinder having a knurled or otherwise textured outer surface 23 which may be easily grasped and rotated by a user.

A locking protrusion 25 is located on an underside 24 of the grip portion 22. The locking protrusion 25 includes a latch portion 26, which is generally elongate, extending in a direction parallel with the underside 24 of the grip portion 22.

Protruding from the latch portion 26, further from the grip portion 22 than the latch portion 26, is a locking pin 27, which preferably has a generally round cross-section.

In practice, the locking plunger 21 may be used to secure two plates together. As shown in FIG. 3 a first plate 28 has an elongate, slot-shaped aperture 29 formed therethrough. A second plate 30 has a generally round aperture 31 formed therethrough.

The locking plunger 21 is arranged so that the locking pin 27 passes through the elongate aperture 29 of the first plate 28, and the locking plunger 21 is biased toward the first plate 28 by a suitable spring (not shown).

When the grip portion 22 is rotated so that the latch portion 22 is not aligned with the slot-shaped aperture 29, the locking pin 27 does not protrude all of the way through the first plate 28, and hence does not interact with the second plate 30. The second plate 30 may therefore move freely with respect to the first plate 28.

However, when the grip portion 22 is rotated so that the latch portion 26 is aligned with the slot-shaped aperture 29, the latch portion 26 moves into the slot-shaped aperture 29, and the locking pin 27 then protrudes from the underside of the first plate 28, and may fit into the circular aperture 31 of the second plate 30. The first and second plates 28, 30 are then pivotally connected together.

A locking plunger 21 of this type has the advantage that, beginning from the locked position (i.e. with the latch portion 26 received in the slot-shaped aperture 29), the locking plunger 21 may be pulled outwardly and rotated through 90°, so that the latch portion 26 is no longer aligned with the slot-shaped aperture 29. The locking plunger 21 may then be released, and it will be biased against the upper surface of the first plate 28. In this unlocked configuration, the second plate 30 may move freely with respect to the first plate 28. The user is not required to hold or otherwise interact with the locking plunger 21 to maintain this state. When it is desired to attach the plates 28, 30 together once again, the locking plunger 21 may be rotated through a further 90°, so that the latch 26 aligns with the slot-shaped aperture 29, and the locking plunger 21 is biased once again into the locked position.

While locking plungers of this kind have been found to be effective for this purpose, the invention is not limited to these, and any other suitable kind of device or system may be used that allows two components to be selectively connected together, and then released.

Returning to FIG. 2, the first and second locking plungers 32, 33 are provided on the fixed plate 9, and a third locking plunger 34 is positioned on the support arm 13, towards the second, free end 17 thereof. The purpose of these three locking plungers 32, 33, 34 will become clear during the following description.

When in the stowed position shown in FIG. 2, the components of the rest 7 are held in the stowed position by the first and third locking plungers 32, 34.

The first locking plunger 32 initially passes through the fixed plate 9 and into an aperture (not shown) in the support arm 13.

The third locking plunger 34, which is provided towards the second end 17 of the support arm 13, passes through the support arm 13 and into an aperture 60 (visible in FIG. 4) formed in the fixing plate 20. With these two locking plungers 32, 34 in the locked position, the support arm 13 is held in place with respect to the support stem 8 and fixed plate 9.

Before the support arm 13 can be moved into the deployed position, the first and third locking plungers 32, 34 must be moved into their retracted positions. As will be understood from the discussion above, this may be done by manually withdrawing each locking plunger, and rotating the locking plunger so that the latch portion 26 thereof is no longer aligned with the slot-shaped aperture 29 formed through the fixed plate 9 (in the case of the first locking plunger 32) or the support arm 13 (in the case of the third locking plunger 34).

In order to move the rest 7 into the deployed position, the support arm 13 is firstly pivoted outwardly with respect to the fixed plate 9.

Figure 5:
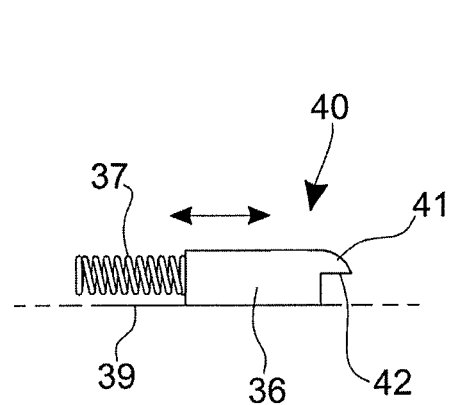
FIG. 5 shows components of a latching mechanism.

The support arm 13 has a latching protrusion 35 provided at the first end 16 thereof. A latch receiver 36 is connected via a spring 37 to a protrusion 38 on the top of the support stem 8. The latch receiver 36 is positioned to slide along a top edge 39 of the fixed plate 9, and is shown in more detail in FIG. 5.

At its free end 40 the latch receiver 36 has an inclined pushing surface 41 formed on its top side, and a downward-facing shoulder 42 formed on its bottom side.

The latch receiver 36 may be pushed towards the protrusion 38 by a suitable force, but when the force is removed the latch receiver 36 will return (under the influence of the spring 37) to its default position.

Figure 4:
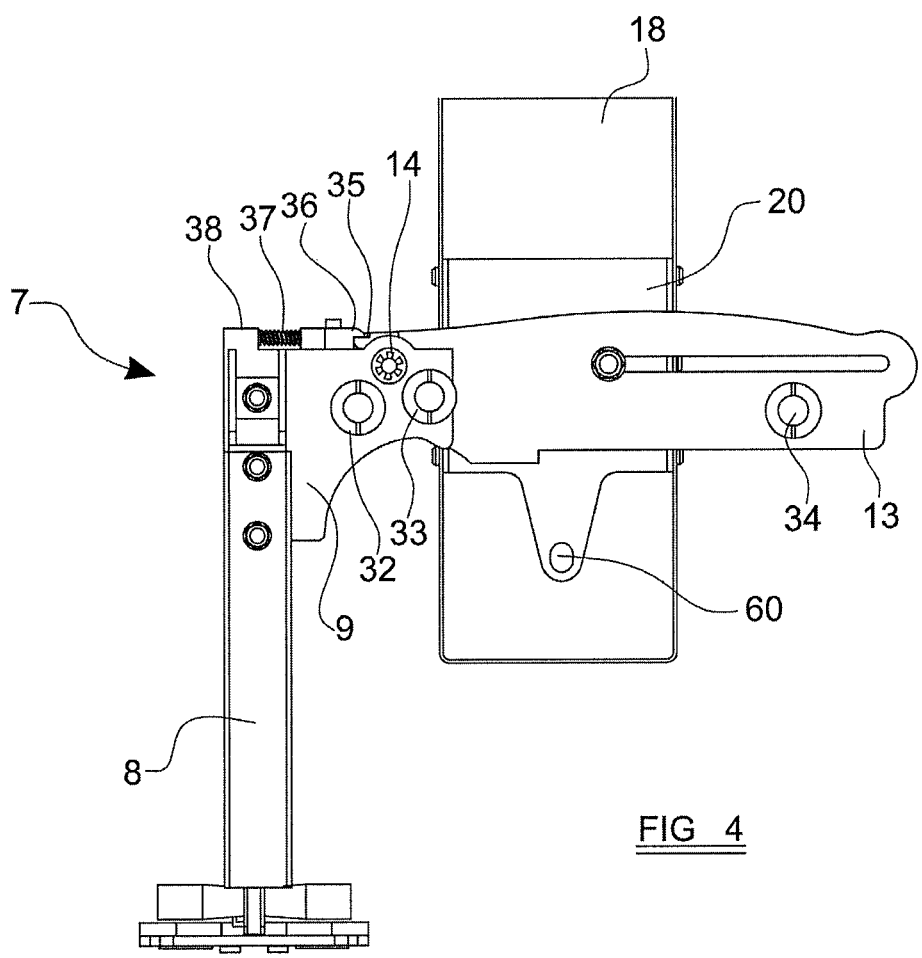
FIG. 4 shows a stage in the deployment of the back/headrest of FIG. 2.

As the support arm 31 is rotated into the deployed position, shown in FIG. 4, the latching protrusion 35 thereof presses against the inclined pushing surface 41 of the latch receiver 36, thereby pushing the latch receiver 36 directly towards the protrusion 38 on the top of the support stem 8. The latch protrusion 36 therefore moves to allow the latch protrusion 35 to be aligned with the shoulder 42 thereof. When this has occurred, the spring 37 drives the latch receiver 36 back to its default position, in which the latching protrusion 35 is held in the shoulder 42, thus holding the support arm 31 in position and preventing the support arm 31 from rotating under the influence of gravity back to the stowed position shown in FIG. 2.

The skilled reader will appreciate that this spring-biased latch retainer 36 will allow the support arm 13 to be moved easily into the deployed position and to remain in this position without effort on the user's part. In embodiments of the invention the latch receiver 36 may be omitted, although this will make the process of placing the rest 7 in the deployed opposition less convenient.

In FIG. 4 the support surface 18 is shown in the vertical position, i.e. oriented in the same manner as in the stowed position shown in FIG. 2. It is envisaged that the user will grasp the support surface 18 and use this to rotate the support arm 13 from the stowed position to the deployed position, while maintaining the vertical or substantially vertical orientation of the support surface 18.

Once the support arm 13 has been moved into the deployed position shown in FIG. 4, the second locking plunger 33, which is initially in the unlocked position, is placed into the locked position, so that it passes through both the fixed plate 9 and an aperture (not shown) in the support arm 13. Once this is done the support arm 13 is held in place with respect to the fixed plate 9 both at the pivoting connection 14 and at the second locking plunger 33, and rotation between the support arm 13 and the fixed plate 9 is therefore prevented.

As a next stage, the support surface 18 is slid along the length of the slot 14, so the connection 19 between the support surface 18 and the slot 14 is at the distal end of the slot 14, i.e. the end furthest from its pivoting connecting 14 with the fixed plate 9.

In this position (shown in FIG. 6), the third locking plunger 34 may be moved from the unlocked position to the locked position, where it will pass through both the support arm 13 and an aperture (not shown) in the bracing plate 20, which is affixed to the rear side of the support surface 18.

In this position, the rest 7 is in its deployed state, and is ready to support a wheelchair occupant. As the skilled reader will understand, a wheelchair may be reversed so that the front side of the support surface 18 supports the back and/or head of the occupant during movement of the vehicle.

Figure 7:
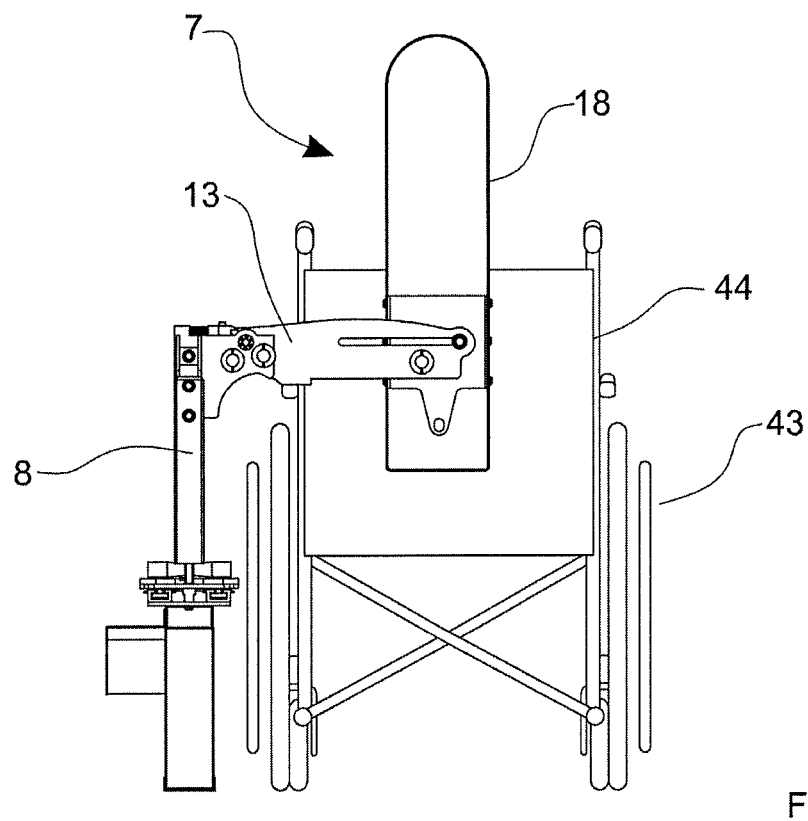
FIG. 7 shows the back/headrest of FIG. 2 in a deployed position, in use with a wheelchair.

FIG. 7 shows the rest 7 being used in conjunction with a wheelchair 43. As can be seen in this figure the support surface 18 is generally centrally aligned with respect to the backrest 44 of the wheelchair 43, and extends above the level of the top of the backrest 44 to support the head of an occupant (not shown) of the wheelchair 43.

Figure 6:
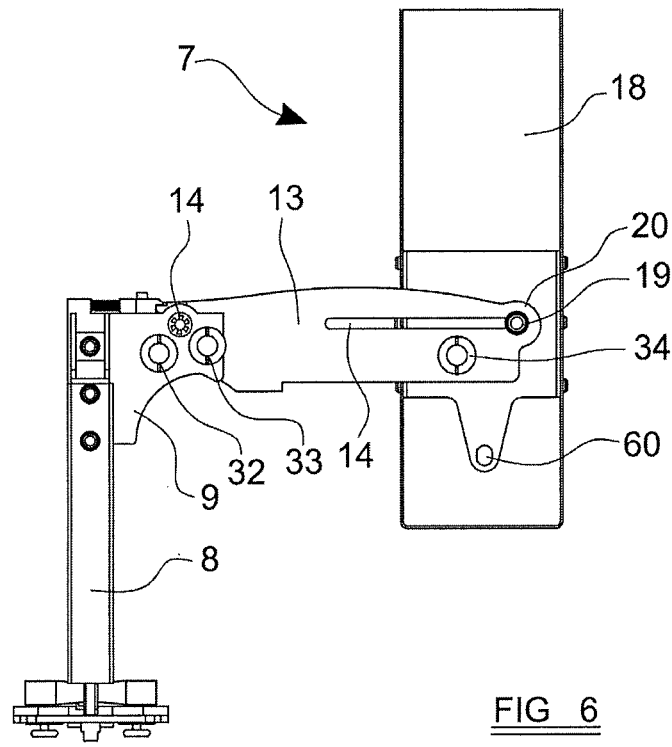
FIG. 6 shows the back/headrest of FIG. 2 in a deployed position.

To return the rest 7 from the deployed position (as shown in FIG. 6) to the stowed position, the sequence of events that take place during deployment are largely reversed. The rest 7 may be moved to the stowed position as follows:

Release the third locking plunger 34;
slide the support surface 18 along the length of the slot 14 as far as possible towards the fixed plate 9;
release the second locking plunger 33;
manually withdraw the latch retainer 36;
pivot the support arm 13 downwardly into the stowed position, shown in FIG. 2; and
engage the first and third locking plungers 32, 34.

The skilled reader will appreciate that the mechanism described above provides a robust and simple way for the support surface 18 to be moved between a stowed position and a deployed position while remaining substantially within the same plane. The first motion (i.e. from the position shown in FIG. 2 to the position shown in FIG. 3) moves the support surface 18 part of the way to its deployed position. Providing a slot in the support arm 13 allows the support surface 18 to be moved fully into its deployed position. Having a mechanism with a single, simple pivoting movement would not allow the support surface 18 to be held at a sufficient distance from the support stem 8, when in the deployed position.

Figure 8:
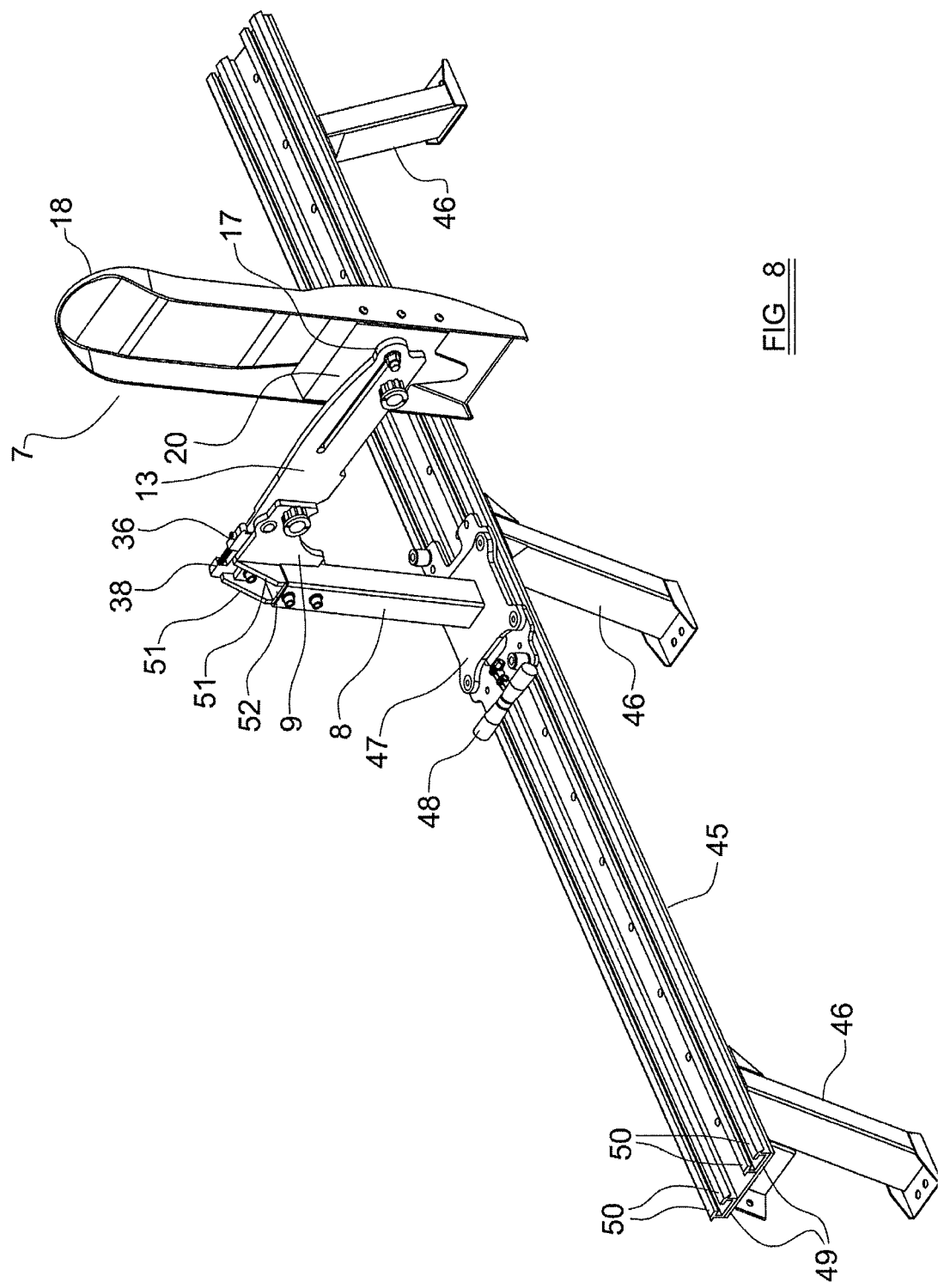
FIG. 8 shows the back/headrest of FIG. 2 with a track.

Turning to FIG. 8, in embodiments of the invention the rest 7 is mounted on a track 45, and the rest 7 may be slid along the length of the track 45 and locked in a desired position. In the example shown the track 45 extends in a direction which is substantially parallel to the plane in which the support surface 18 moves between the stowed and deployed positions.

In the example shown the track 45 is supported by three legs 46, but the track 45 may be supported in any suitable way, for instance by being attached in a cantilevered manner to the interior surface of a vehicle wall. In many vehicles such as ambulances, seats are provided mounted on a track, such that each seat may be slid to a suitable position along the length of a track and locked in place. In advantageous embodiments of the invention, the rest 7 may be provided on a track which also supports one or more slideable seats.

In the example shown the support stem 8 is attached at its lower end to a base plate 47, which is adapted to slide along the length of the track 45. The base plate includes a locking handle 48 which may be used to lock the base plate 47 in a desired longitudinal position along the length of a track 45.

In some embodiments the base plate 47 may slide continuously along the length of the track 45 and be locked in any position along the length of a track 45. In other embodiments, there may be spaced-apart attachment locations (not shown) along the length of the track 45 and the base plate 47 may only be fixed in position at one of these locking locations.

In the example shown, the track comprises a pair of spaced-apart grooves 49 with retaining lips 50 partially closing the top side of each groove 49. The locking plate 47 has feet (not shown) which may travel along the grooves 49. When the locking handle 48 is deployed, the lips 50 are wedged tightly between co-operating components of the base plate 47, thus locking the base plate 47 in position with respect to the track 45.

The skilled reader will appreciate that there are many ways in which the base plate 47 may travel along a track, and be locked in place with respect thereto, and the invention is not limited to the particular example discussed above.

FIG. 8 is a perspective view, in which it can be seen that, at the top end 52 of the support stem 8, a pair of angled support struts 51 connect the support stem 8 to the fixed plate 9. The skilled reader will appreciate that these struts 52 will increase the robustness of the connection between the support stem 8 and the fixed plate 9.

Figure 9:
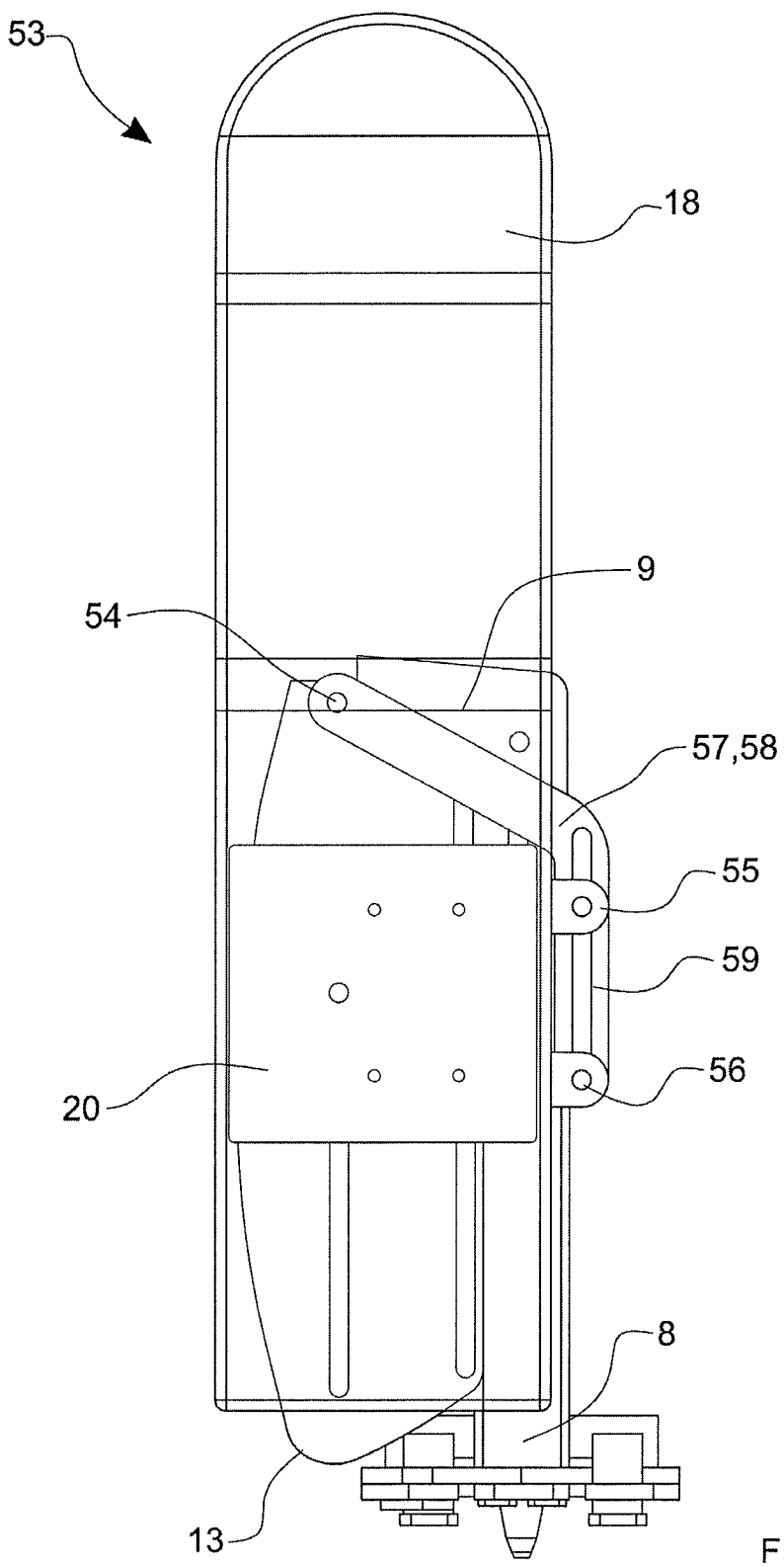
FIG. 9 shows a second back/headrest embodying the invention in a stowed position.
Figure 10:
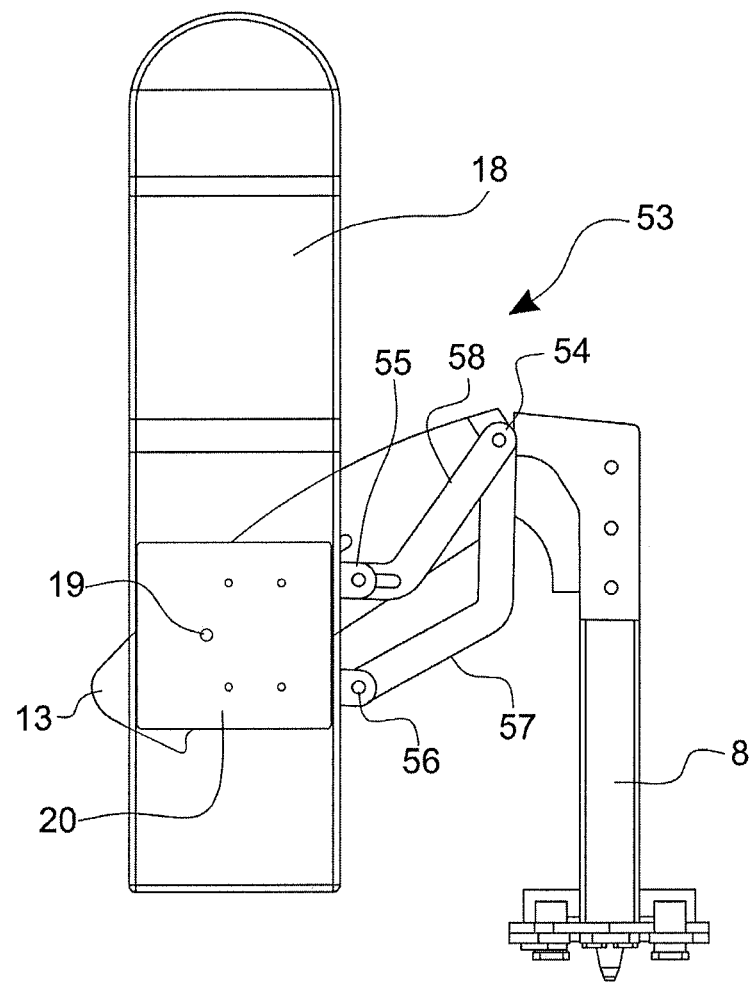
FIG. 10 shows a stage in the deployment of the back/headrest of FIG. 9.
Figure 11:
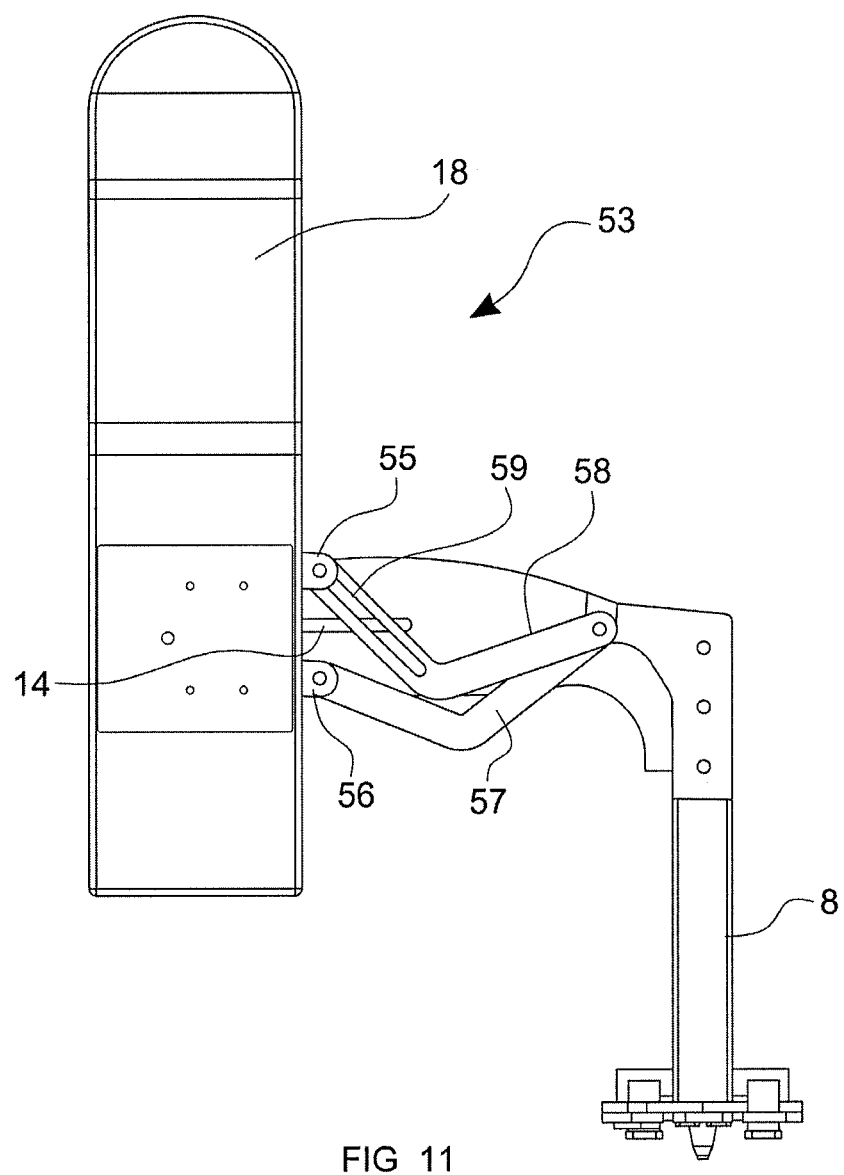
FIG. 11 shows the back/headrest of FIG. 9 in a deployed position.

FIGS. 9 to 11 show an alternative embodiment of the invention, which is particularly suited to powered deployment of the support surface 18. In this embodiment, as the support arm 13 is pivoted into the deployed position, the support surface 18 is automatically driven along the length of the slot 14 so that, as the support arm 13 arrives in the deployed position, the support surface 18 is positioned at the distal end of the slot 14, as will be explained below.

In FIGS. 9 to 11 the components which also appear in the previous embodiment will be designated with reference numerals.

FIG. 9 shows the second rest 53 in the initial, stowed position. In common with the embodiment described above, the second rest 53 has a support stem 8 and a support arm 13 pivotally connected thereto at a pivot point 54.

The bracing plate 20, which is attached to the rear side of the support surface 18, has upper and lower tabs 55, 56 protruding from the side thereof which, in use, lies closest to the vehicle wall. Each tab 55, 56 has a central aperture passing therethrough.

A lower guide arm 57 and an upper guide arm 58 are also attached, at respective first ends thereof, to the fixed plate 9 at the same pivot point 54 at which the support arm 13 is attached thereto. The lower and upper guide arms 57, 58 are both elongate and have an obtuse angle formed partway along their length. In the view shown in FIG. 9 the upper and lower guide arms 57, 58 lie immediately on top of one another, and the guide arms 57, 58 can be seen more clearly in FIGS. 10 and 11.

The lower guide arm 57 is connected at its second end to the lower tab 56 by a suitable pivotal connection.

The upper guide arm 58 has a guide slot 59 formed along part of its length, and the upper tab 55 is pivotally and slideably connected to the upper guide arm 58 by a pivotal connection which passes through the guide slot 59.

When the support arm 13 is pivoted from the stowed position towards the deployed position, as shown in FIG. 10, the lower guide arm 57 will push the support surface 18 along the slot 14 formed in the support arm 13 toward the distal end of the slot 14. This occurs because of the distance between the point at which the support surface 18 pivots with respect to the support arm 13, i.e. the pivoting connection 19 which is attached to the bracing plate 20 of the support surface 18, and passes through the slot 14, and the point at which the lower guide arm 57 pivots with respect to the support surface 18, i.e. the lower tab 56.

During this motion the upper tab 55 will slide along the slot 59 formed in the upper guide arm 58.

FIG. 11 shows the support surface 18 in its fully deployed position. The support surface 18 is positioned at the distal end of the slot 14, and the upper tab 55 is at the distal (i.e. free) end of the slot 59 formed in the upper guide arm 58.

The skilled reader will understand that, as discussed above, when the support arm 13 is moved into the deployed position, the support surface 18 automatically moves along the slot 14 to the distal end thereof. Conversely, as the support arm 13 is moved from the deployed position back to the stowed position, the support surface 18 returns to the proximal end of the slot 14. This means that the support surface 18 may be deployed in a single action, rather than in a two-stage process as shown in the embodiment of FIGS. 2 to 8.

The embodiment shown in FIGS. 9 to 11 is particularly suitable for a powered embodiment of the invention. The support arm 13 may be rotated with respect to the support stem 8 by a motor (not shown) when required. The arrangement of the upper and lower guide arms 57, 58 will cause the support surface 18 to move to the distal end of the slot 14 as this occurs. A single motor may therefore be used to move the second rest 53 from the stowed position to the deployed position, and also from the deployed position back to the stowed position.

The arrangements shown from FIGS. 9 to 11 need not be used with a motor, however, and it is envisaged that this embodiment may also be operated manually.

As with the embodiment shown in FIGS. 4 to 8, the embodiment shown in FIGS. 9 to 11 may be mounted on a track for movement there along.

In the embodiments discussed above the fixed plate 9 is supported on a support stem which is arranged generally vertically. In other embodiments of the invention this need not be the case and the fixed plate 9 may, for example, be attached directly to the internal wall of a vehicle.

The devices discussed above provide a back/headrest that may be moved between a stowed position and a deployed position (and back again) while the support surface thereof remains in the same or substantially the same orientation. In other words, in the stowed position the support surface is in a first plane, and in the deployed position the support surface is in the first plane, or is in another plane which is parallel or substantially parallel with the first plane. While specific examples of mechanisms to allow this are discussed above, the invention is not limited to these and any suitable mechanism to allow this movement during deployment and stowage may be used.

This will allow use of the back/headrest to be less obtrusive within a vehicle or other confined space. In particular, the back/headrest will not need to move through an arc (e.g. as shown in FIG. 1b).

Embodiments of the invention will also be more robust, in particular when the vehicle experiences large forces in the forwards/backwards direction of the vehicle. Because the support arm does not (in normal operation) pivot around support stem (i.e. around a vertical axis), failure of any locking parts is much less likely to allow the support arm to pivot in this way in the event of a crash, heavy braking etc.

The skilled reader will appreciate that the embodiments discussed above provide a useful and robust rest for supporting a wheelchair or other moveable object within a vehicle during transit.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A device to support the back and/or head of a wheelchair user in a vehicle, the device comprising:
   a support arrangement comprising a first component which is fixed in place;
   a support arm comprising a free end and an end pivotally attached to the first component and
   a back/headrest which presents a substantially planar support surface, the back/headrest being moveable with respect to the support arrangement between a stowed position, in which the back/headrest is relatively close to the support arrangement, and a deployed position, in which the back/headrest is supported at a second, greater distance from the support arrangement,
   wherein when the back/headrest is in the stowed position the support surface lies in a first plane, and when the back/headrest moves to the deployed position, the support surface thereof is in the first plane, or in a further plane which is substantially parallel with the first plane, and
   wherein the back/headrest is attached to the support arm.

2. The device according to claim 1, wherein the back/headrest is pivotally attached to the support arm.

3. The device according to claim 1, wherein the back/headrest may move along at least a part of the length of the support arm.

4. The device according to claim 3, wherein the support arm has a slot formed along part of the length thereof, and wherein the back/headrest may travel along at least part of the length of the slot.

5. The device according to claim 3 wherein, in a first part of a deployment process, the support arm may be pivoted with respect to the fixed component, and in a second stage of the deployment process, the back/headrest may be moved along at least a part of the length of the support arm.

6. The device according to claim 3, wherein the back/headrest is connected to the fixed component such that, as the support arm pivots into the deployed position, the back/headrest is automatically driven along at least a part of the length of the support arm.

7. The device according to claim 1, further comprising a latch arrangement which is operable to hold the support arm in the deployed position.

8. The device according to claim 1, wherein the back/headrest may be locked in the deployed position with respect to the support arrangement.

9. The device according to claim 1, wherein the support arrangement is slideable along a track, and may be selectively locked in place with respect to the track at one or more attachment locations.

10. The device according to claim 9, wherein the track extends in a direction which is substantially perpendicular to the plane of the support surface.

11. A vehicle having a device according to claim 1 installed therein.

12. The vehicle according to claim 11, wherein the support arrangement is attached to, or formed as part of, an internal sidewall of the vehicle.

13. A method of providing support to the back and/or head of a wheelchair user in a vehicle, the method comprising the steps of:
   providing a device according to claim 1, with the back/headrest being initially in the stowed position;
   moving the back/headrest to the deployed position; and
   supporting at least part of a wheelchair or wheelchair occupant against the support surface.

14. The method according to claim 13, wherein the step of providing a device comprises providing a device according to claim 5, wherein the step of moving the back/headrest into the deployed position comprises pivoting the support arm with respect to the fixed component, and subsequently sliding the back/headrest along at least part of the length of the support arm.

15. The method according to claim 13, wherein the step of providing a device comprises providing a device according to claim 6, wherein the step of placing the back/headrest in the deployed position comprises substantially one single movement.

* * * * *